H. MILLER.
PROVISION SAFE.
APPLICATION FILED NOV. 9, 1908.

913,222.

Patented Feb. 23, 1909.

Witnesses:

Inventor
Hulda Miller
By James N. Ramsey
Attorney

UNITED STATES PATENT OFFICE.

HULDA MILLER, OF ROSSMOYNE, OHIO.

PROVISION-SAFE.

No. 913,222.      Specification of Letters Patent.      Patented Feb. 23, 1909.

Application filed November 9, 1908. Serial No. 461,666.

*To all whom it may concern:*

Be it known that I, HULDA MILLER, a citizen of the United States, residing at Rossmoyne, in the county of Hamilton and State of Ohio, have invented certain new and useful Improvements in Provision-Safes, of which the following is a specification.

My invention relates to provision safes, and the object is to provide a receptacle for bread or other articles of food in bulk form, along with a container having shelves adapted for the storage of pies or cakes, or other articles of a similar nature.

My invention consists in the combination with a bread box having a lid opening upwardly, of a receptacle attached thereto, with a door opening forwardly, and provided interiorly with shelves.

My invention also consists in the parts and in the details of construction and arrangement of parts as will hereinafter be more fully described and claimed.

Figure 1:
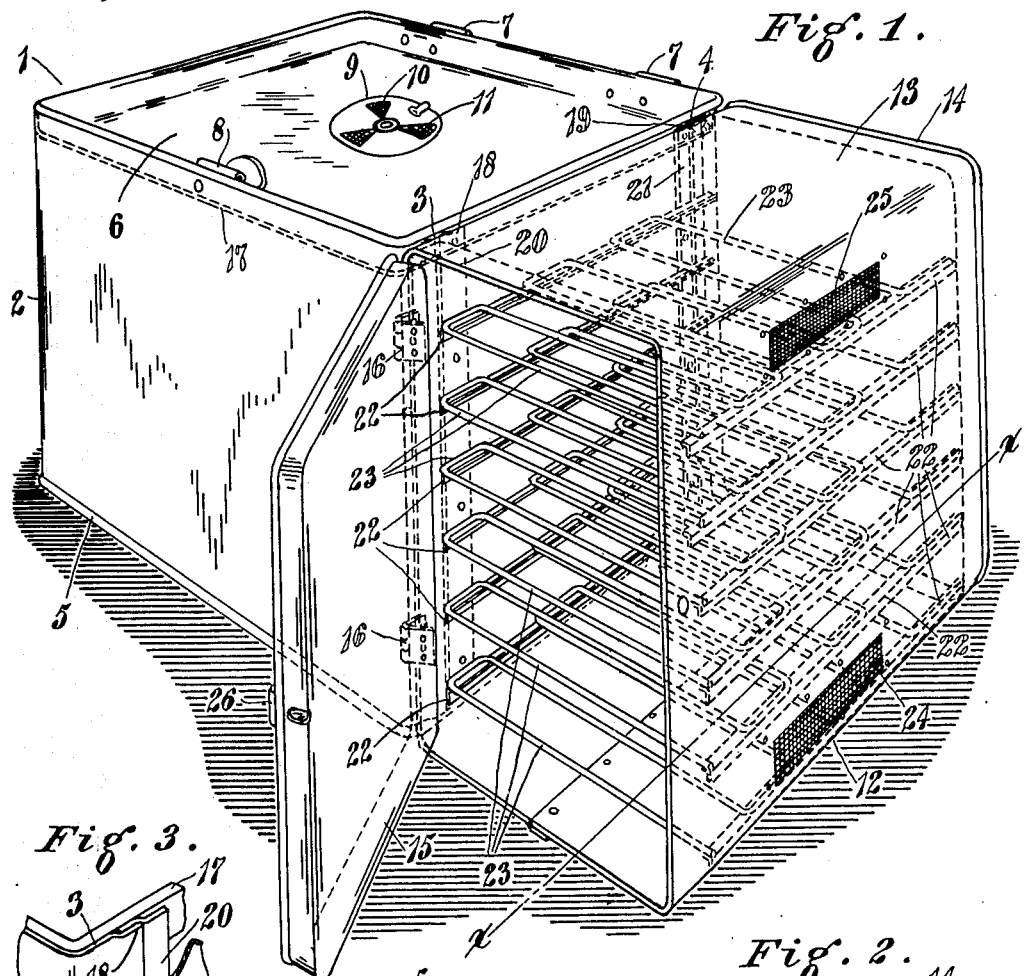
Figure 3:
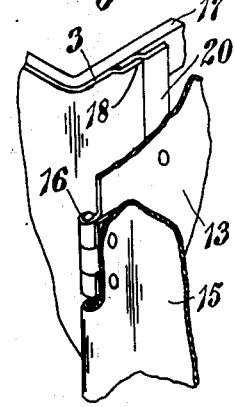
Figure 2:
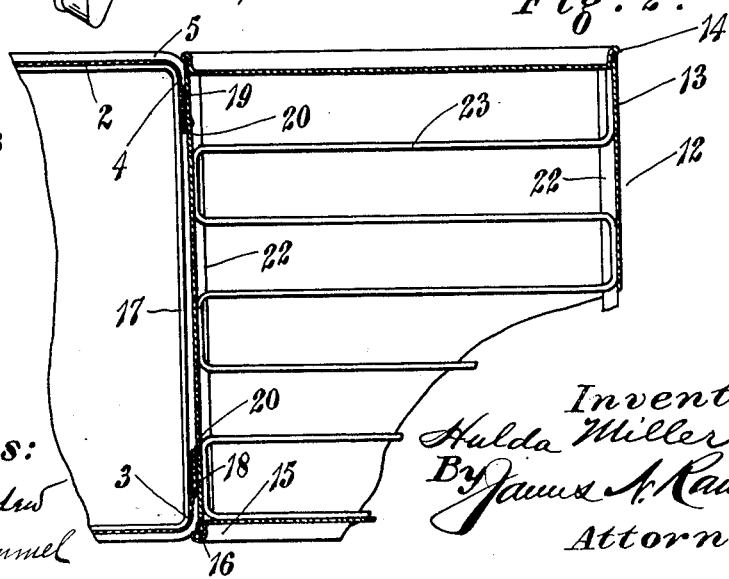

In the drawing: Figure 1 is a general perspective view of a device embodying my invention. Fig. 2 is a cross section of part of the device on a line corresponding to the line $x$—$x$ of Fig. 1. Fig. 3 is a perspective view of adjoining parts of the bread box, and the receptacle secured thereto, better illustrating the construction of the same.

Constructed as illustrated, the bread box 1 comprises a sheet 2 which forms the front back and one end thereof, and also forms parts 3 and 4 of the other end. The bottom of the bread box is composed of a formed up sheet having a bead 5, this sheet being let into the space inclosed by the lower part of the sheet 2, and the bead 5 coming against the lower edge of the sheet 2. This bottom is fastened into the bread box in any suitable manner, such as by soldering or riveting. The lid 6 of the bread box is composed of a formed up sheet similar to the sheet forming the bottom, and is provided with hinges 7 attaching it to the box at the rear. This lid 6 is also provided with a suitable catch 8 at the front, and has a ventilator 9 provided with a screened opening 10, and a slotted disk 11 for opening or closing it.

The receptacle 12 comprises a plate 13 bent around to form the sides and the top and bottom of it and has a back composed of a formed up plate which is let into the space inclosed by the rear part of the plate 13, with a bead 14 coming against the rear edges of the plate 13. This back is secured in place in any suitable manner, as is the bottom in the bread box. The receptacle is also provided with a door 15 composed of a formed up plate which fits into the front of the receptacle. This door has hinges 16 at each side by which it is hinged to the receptacle, parts of the hinges 16 being formed integral with the plate 13 which forms the sides and top and bottom of the receptacle.

The bread box is provided with an interior rim 17 which is secured to the plate 2 adjacent to its top edge. This rim 17 is continuous around the four sides of the bread box and consequently passes across the gap between the parts 3 and 4 of the end. It is against the top edge of this rim 17 that the bead of the lid 6 abuts when the lid is closed. The parts 3 and 4 adjacent to their terminal edges are bent so as to form clips 18 and 19 respectively extending from the top of the bottom of the bread box. The receptacle 12 is provided with strips 20 and 21 on its side, passing from its top to its bottom, bent so as to form clips adapted to fit into the clips 18 and 19 respectively on the bread box. The lower terminations of the strips 20 and 21 are adapted to come into contact with the bead 5 at the bottom of the end of the bread box, whereby further downward movement of said strips is prevented.

Interiorly, the receptacle 12 is provided on each of its sides with a series of strips 22 extending from the front to the rear of the receptacle along its sides, and these strips 22 are adapted to form supports for shelves 23 which, preferably, are composed of wire bent into a series of sinuations, each shelf thus forming a kind of grating across the receptacle. The side of the receptacle opposite to that which is provided with the strips 20 and 21 is provided with screened ventilating openings 24 and 25 so that there may be a proper circulation of air through the receptacle. The receptacle 12 being smaller than the bread box 1 it may, when detached, be placed inside of the bread box for storage and shipping. When it is desired to use it, it may be readily placed in position on the end of the bread box, thus closing the end thereof, and forming, with it, a practically continuous structure. The door 15 is also provided with a catch 26 similar to the catch 8 on the lid of the bread box.

By constructing the bread box, as shown, of a single plate 2, forming the front, back and one end with the parts 3 and 4 extending around the other end sufficiently far to form the device for attaching the receptacle 12, and then allowing the side of the receptacle 12 to form the remainder of the end of the bread box, sufficient material is saved to constitute the entire structure of a construction as economical as if the bread box and receptacle 12 were permanently secured together, inasmuch as the partition between the bread box and the receptacle 12 comprises only a single thickness, and the terminal parts 3 and 4 of the plate 2 are made to form the clips for securing the receptacle 12 to the bread box.

Having fully described my invention, what I claim as new and desire to secure by Letters Patent is:

As a new and improved article of manufacture, a provision safe composed of a single plate forming the front, back and one end thereof, and having terminal parts forming the parts of the other end, a bottom composed of a formed up plate let into the space inclosed by the lower part of the plate which forms the front, back and one end, an interior rim secured to the plate adjacent to its upper edge and being continuous around the four sides of the bread box, the terminal parts of the plate which forms the parts of the end being bent to form clips extending from the top to the bottom of the bread box, a receptacle comprising a single sheet bent to form the top, bottom and sides thereof, and a back composed of a formed up plate let into the space inclosed by the other part of the plate which forms the top, bottom and sides of the receptacle, strips on each side of the receptacle bent to form clips extending from its top to its bottom and positioned thereon so as to engage within the clips formed by the terminal parts of the plate comprised in the bread box, the plate forming the bottom of the bread box being provided with a bead against which the lower terminations of the strips of the receptacle are adapted to engage to limit their further downward movement, substantially as and for the purposes set forth.

HULDA MILLER.

Witnesses:
JAMES N. RAMSEY,
CLARENCE PERDEN.